United States Patent [19]

Hartwich et al.

(10) Patent No.: US 7,848,317 B2
(45) Date of Patent: Dec. 7, 2010

(54) COMMUNICATION MODULE SYSTEM HAVING AN INTERFACE MODULE AND INTERFACE MODULE (75) Inventors: Florian Hartwich, Reutlingen (DE); Jan Taube, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 11/667,509

(22) PCT Filed: Nov. 25, 2005

(86) PCT No.: PCT/EP2005/056240

§ 371 (c)(1), (2), (4) Date: Sep. 10, 2007

(87) PCT Pub. No.: WO2006/056605

PCT Pub. Date: Jun. 1, 2006

(65) Prior Publication Data

US 2008/0123678 A1 May 29, 2008

(30) Foreign Application Priority Data

Nov. 26, 2004 (DE) .................. 10 2004 057 410

(51) Int. Cl.
*H04L 12/50* (2006.01)
*H04Q 11/00* (2006.01)

(52) U.S. Cl. ................ 370/360; 370/364; 370/402; 370/537; 710/27; 710/100; 710/306

(58) Field of Classification Search ........... 370/360, 370/364, 402, 537; 710/27, 100, 306
See application file for complete search history.

(56) References Cited

U.S. PATENT DOCUMENTS

| 4,039,757 | A | * | 8/1977 | Frisone | 370/450 |
| 4,315,308 | A | * | 2/1982 | Jackson | 710/33 |
| 4,752,924 | A | * | 6/1988 | Darnell et al. | 370/431 |
| 5,166,926 | A | * | 11/1992 | Cisneros et al. | 370/392 |
| 5,703,875 | A | * | 12/1997 | Burnett | 370/381 |
| 5,822,550 | A | * | 10/1998 | Milhaupt et al. | 710/315 |
| 5,875,037 | A | * | 2/1999 | Murata et al. | 358/400 |

(Continued)

FOREIGN PATENT DOCUMENTS

DE     102 11 285     11/2002

(Continued)

OTHER PUBLICATIONS

Ekiz et al.: "Performance Analysis of a CAN/CAN Bridge" Oct. 29, 1996, Proceedings of the International Conference on Network Protocols, pp. 181-188.

*Primary Examiner*—Aung S Moe
*Assistant Examiner*—Benjamin Elliott
(74) *Attorney, Agent, or Firm*—Kenyon & Kenyon LLP (57) ABSTRACT A communication module system has an interface module for interconnection with at least one communication module, the interface module containing an input, via which the interface module receives first data and/or messages, a first transmission path and a second transmission path being provided in the interface module, a coupling element being provided in the second transmission path, which coupling element is implemented in such a way that the first data and/or messages are at least partially combined to form second data and/or messages.

16 Claims, 5 Drawing Sheets

U.S. PATENT DOCUMENTS

| | | | |
|---|---|---|---|
| 6,223,242 B1 * | 4/2001 | Sheafor et al. | 710/317 |
| 6,457,087 B1 * | 9/2002 | Fu | 710/305 |
| 6,748,305 B1 * | 6/2004 | Klausner et al. | 701/35 |
| 6,801,942 B1 * | 10/2004 | Dietrich et al. | 709/225 |
| 6,823,439 B2 * | 11/2004 | Spencer | 711/171 |
| 7,061,908 B1 * | 6/2006 | Tanovic | 370/372 |
| 7,145,914 B2 * | 12/2006 | Olarig et al. | 370/413 |
| 7,246,194 B2 * | 7/2007 | Train et al. | 710/311 |
| 7,296,093 B1 * | 11/2007 | Olarig et al. | 709/250 |
| 2003/0126297 A1 * | 7/2003 | Olarig et al. | 709/250 |
| 2004/0088517 A1 * | 5/2004 | Spencer | 711/220 |
| 2005/0021764 A1 * | 1/2005 | Barrall et al. | 709/227 |
| 2006/0174042 A1 * | 8/2006 | Weigl et al. | 710/100 |
| 2007/0044131 A1 * | 2/2007 | Yoshida | 725/116 |
| 2008/0123678 A1 * | 5/2008 | Hartwich et al. | 370/419 |

FOREIGN PATENT DOCUMENTS

| | | |
|---|---|---|
| EP | 1 026 597 | 8/2000 |
| EP | 1 189 393 | 3/2002 |
| EP | 1189393 A2 * | 3/2002 |
| JP | 2002-111701 | 4/2002 |

* cited by examiner

COMMUNICATION MODULE SYSTEM HAVING AN INTERFACE MODULE AND INTERFACE MODULE

BACKGROUND OF THE INVENTION

1. Field of the Invention

The present invention relates to a method and a communication module system having an interface module for interconnection with a communication module for linking a communication connection, e.g., a bus, to a user assigned to the communication module.

2. Description of Related Art

The interconnecting of control units, sensor systems, and actuator systems with the aid of a communication system including a communication connection, e.g., a bus, and corresponding communication modules has drastically increased in recent years in the construction of modern motor vehicles and in mechanical engineering, in particular in the machine tool field, and also in automation. Synergy effects through distribution of functions to multiple users, in particular control units, may be achieved in this case. These are referred to as distributed systems. Such distributed systems or networks thus include users as well as the bus system or multiple connecting bus systems connecting these users. The communication between different stations or users thus occurs more and more often via such a communication system or bus system, via which the data to be transmitted is transmitted in messages. This communication traffic on the bus system, access and receiving mechanisms, as well as error handling are regulated via a corresponding protocol.

For example, the CAN (controller area network) is established as a protocol in the automotive field. This is an event-controlled protocol, i.e., protocol activities such as the transmission of a message are initiated by events which have their origin outside the communication system. Unique access to the communication system or bus system is resolved via a priority-based bit arbitration. A condition for this purpose is that the data to be transmitted and thus each message is assigned a priority. The CAN protocol is very flexible; adding further users and messages is thus possible without problems as long as there are still free priorities (message identifiers). The aggregate of all messages to be transmitted in the network with priorities and their transmitting and/or receiving users and/or the corresponding communication modules is stored in a list, the communication matrix.

An alternative approach to event-controlled, spontaneous communication is the purely time-controlled approach. All communication activities on the bus are strictly periodic. Protocol activities such as the transmission of a message are only triggered by the elapse of a time which is valid for the entire bus system. The access to this medium is based on the distribution of time slots in which a transmitter has exclusive transmission right. The message sequence is typically to be established even before starting operation. Thus, a schedule is generated, which fulfills the requirements of the messages in regard to repetition rate, redundancy, deadlines, etc. This is referred to as the bus schedule. TTP/C is such a bus system, for example.

The advantages of both types of buses cited are combined in the approach of the time-controlled CAN, the TTCAN (time triggered controller area network). This fulfills the requirements described above for time-controlled communication and the requirements for a certain degree of flexibility. TTCAN fulfills this by establishing communication rounds in exclusive time windows for periodic messages of specific communication users and arbitrating time windows for spontaneous messages to multiple communication users. TTCAN is based essentially on a time-controlled periodic communication, which is clocked by a user or communication module providing a master time, known as the time master, with the aid of a time reference message.

A further possibility for connecting different types of transmission is offered by the FlexRay protocol, which describes a rapid, deterministic, and error-tolerant bus system for use in a motor vehicle in particular. This protocol operates according to the method of time division multiple access (TDMA), the users or the messages to be transmitted being assigned fixed time slots in which they have an exclusive access to the communication connection, i.e., the bus. The time slots repeat in an established cycle, so that the instant at which a message is transmitted via the bus may be predicted exactly and bus access occurs deterministically. In order to optimally exploit the bandwidth for message transmission on the bus system, the cycle is divided into a static part and a dynamic part. The fixed time slots are located in the static part at the beginning of the bus cycle. In the dynamic part, the time slots are allocated dynamically. Exclusive bus access is only made possible therein for a short time in each case, a minislot.

As described above, there are multiple different transmission technologies and therefore multiple types of bus systems. Frequently, multiple bus systems of identical or different types must be connected to one another. A bus interface unit, a gateway, is used for this purpose. A gateway is thus an interface between different buses which may be of identical or different types, the gateway relaying messages from one bus to one or more other buses. Known gateways include multiple independent communication modules, the exchange of messages occurring via the processor interface (CPU interface) of the particular user and/or the corresponding interface module of the particular communication module. This data exchange, in addition to the messages transmitted by the user itself, places a high load on this CPU interface which, together with the transmission structure resulting therefrom, results in a relatively low data transmission rate. Furthermore, there are integrated communication controllers or communication modules which share a joint message memory and thus compensate for the structural disadvantages. However, such integrated communication modules are therefore very inflexible in regard to data transmission and are defined in particular for a specific number of bus connections. It has thus been shown that the related art is not capable of providing optimum results in every respect.

It is an object of the present invention to provide a communication module system and a special interface module, as well as a method, using which the exchange of data and/or messages, e.g., the generation of new data and/or messages, may be improved.

A BRIEF SUMMARY OF THE INVENTION

In accordance with the present invention, the exchange of data and/or messages between multiple communication modules is to be made possible without placing a high load on the CPU interface and without making multiple message memories dependent on one another. At the same time, the transmission rate is to be increased and flexible transmission is to be made possible.

This is achieved implementing a communication interface element as a special gateway interface, which is interposed between the message memories, i.e., in the corresponding data paths, and thus allows a new, additional data path.

According to the present invention, a data integration unit (DIU) is connected to the bus which connects the different communication modules to one another as an interface module, which, in particular, allows data and/or messages received via the gateway to be reassembled or combined before they are routed to one or more buses. More than one such interface module may be connected as a data integration unit. DIUs having different functions may also be used depending on the field of use, for example.

Thus, the present invention discloses an interface module for interconnection with at least one communication module, the interface module containing an input, via which it receives first data and/or messages, a first transmission path and a second transmission path advantageously being provided in the interface module, and a coupling element being provided in the second transmission path which is implemented in such way that the first data and/or messages are at least partially combined to form second data and/or messages.

The interface module expediently has an output, switching means being provided which are implemented in such a way that the first transmission path and the second transmission path of the interface module are interconnected at the output. These switching means are advantageously implemented as a multiplexing module.

The coupling element is expediently implemented as a coupling field, so that with its aid new second data and/or messages may be generated and/or combined from bits, bytes and/or predefinable data blocks and/or partial messages and/or messages and switched at the output. For this purpose, a memory element may advantageously be contained in the second transmission path of the interface module, in which the second data and/or messages are stored until reassembly is completed in order to then relay them completely via the output, the memory element being implemented as a register component in particular.

A module controller, which controls the coupling element and/or the switching means according to the present invention, is advantageously assigned to the interface module, in particular contained therein.

Therefore, messages and/or data may be combined or recombined before the gateway relays the messages in particular. Simultaneously, the host controller, i.e., the user CPU, is decisively relieved by the present invention.

A higher rate in regard to data integration and/or data combination is achievable through the use of the at least one interface module according to the present invention in comparison with a gateway which is assembled from independent communication controllers or communication modules and in which data integration may only be performed via the CPU interface, for example.

Simultaneously, the advantage of higher flexibility and freedom in regard to the configurability of the function of the interface module as a data integration unit and in regard to the number of bus connections is obtained, in particular in relation to an integrated and thus strongly configuration-dependent gateway.

1. Therefore, according to the present invention, a system for communication having a communication module containing an interface module and a communication interface element thus also results, the interface module having an input and an output and being connected to the communication interface element, and a message memory of the communication module and/or communication controller being assigned to the communication interface element, a first data path to and from the message memory being provided, via which first data and/or messages are relayed to and from the message memory, which system for communication is characterized in that the communication interface element provides an additional second data path between multiple communication modules, which is implemented in such a way that the first data and/or messages of the first data path are routed at least partially via the additional second data path and the interface module is switched into the second data path via the input and the output and, in addition, at least partially receives the first data and/or messages and a coupling-element is provided in the interface element, which is implemented in such way that the received first data and/or messages are at least partially combined to form second data and/or messages and transmitted via the second data path. The interface module expediently corresponds to the advantages of the interface module described above as a data integration unit.

Therefore, a communication module system having at least one communication module in which a communication interface element is contained and is assigned to the interface module according to the present invention, which is connected to the communication module, additionally results, a message memory and the first data path, via which first data and/or messages are routed, additionally being included, the communication interface element also providing the additional second data path here, which is implemented in such a way that the first data and/or messages are at least partially routed via the additional second data path and the interface module is switched into this second data path and at least partially receives the first data and/or messages via the second data path and a coupling element is provided in the interface element, which is implemented in such way that the received first data and/or messages are at least partially combined to form second data and/or messages and transmitted via the second data path. If at least two communication modules are provided, each of which contains a communication interface element, the communication modules are connected annularly via the additional second data path in particular, and the at least one interface module according to the present invention switched into the ring transmits the new second data and/or messages via this ring, i.e., the second data path between the communication modules.

It is especially advantageous that such communication modules and corresponding communication interface elements allow a system having at least two such communication modules to be implemented as a gateway and to connect the communication modules via the additional second data paths, e.g., connect them to one another annularly and thus allow rapid and flexible transmission.

The communication interface element expediently contains a first switching means and a second switching means, in particular as multiplexing modules, through which the introduction and/or removal of predefinable data and/or messages into or out of the first data path and/or into or out of the second data path is made possible.

A controller, with which the switching means of the communication element are controlled, is advantageously also assigned to the communication interface element. This controller is contained in the communication interface element itself, according to a first example embodiment. According to a second example embodiment, however, the controller may also expediently be housed in the communication module, or according to a third example embodiment in the user assigned to the communication module. The controller controls the transmission and/or routing of the data and/or messages via the second additional data path and/or in particular defines which data and/or messages are routed on the second data path and/or are transferred from the second data path into the corresponding message memory, i.e., to the first data path.

The controller cited may be implemented in the same way in software or hardware according to all three example embodiments.

2. Furthermore, the present invention provides a method for generating data and/or messages, first data and/or messages of a first data path being supplied from and to a message memory, an interface module, which method is characterized in that an additional second data path is provided, via which the first data and/or messages are at least partially routed to the interface module, and in the interface module, which is switched into the second data path, the first data and/or messages are routed via a first transmission path and a second transmission path in such way that the first data and/or messages are at least partially combined to form second data and/or messages and transmitted again onto the second data path.

Therefore, the following advantages result from the present invention: a higher rate in the transmission of data and/or messages compared to the CPU interface, as well as a very flexible and free configurability of the transmission; this is also due in particular to a very flexible and free definition of the number of bus connections compared to an integrated communication module or an integrated gateway.

Depending on the application, any desired number of communication modules or communication controllers may advantageously be interconnected with a desired number of interface modules for data integration having a desired function, without the individual communication modules or also the interface modules themselves having to be changed. In a typical integrated gateway as described in the related art, changing the functionality of the data integration function or changing the bus connections or the number of the bus connections always requires extensive redevelopment, for example, which may be avoided according to the present invention.

DETAILED DESCRIPTION OF THE INVENTION

Figure 1:
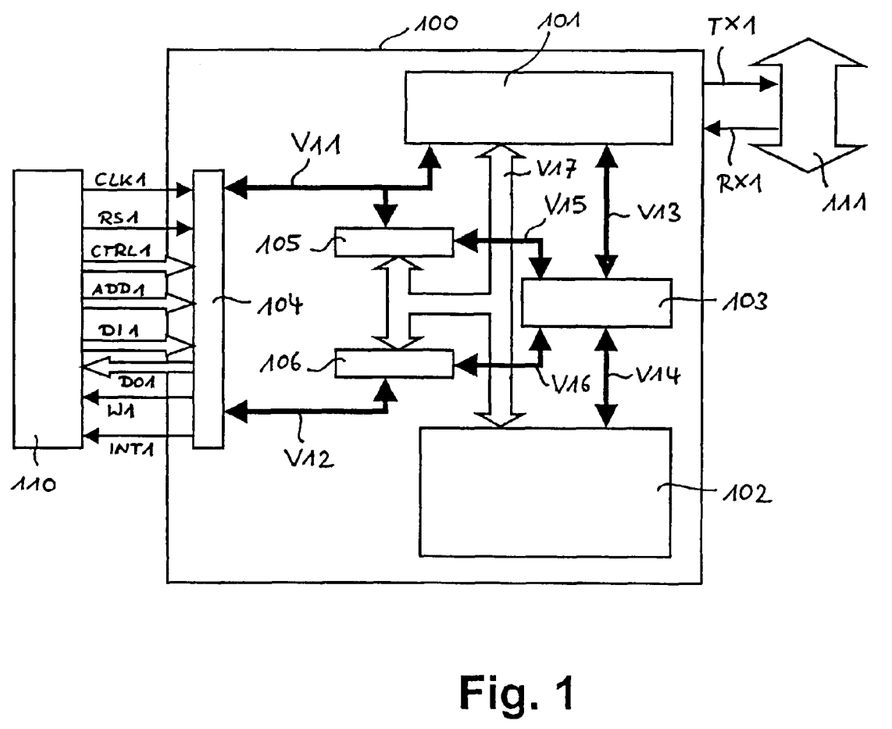
FIG. 1 shows a communication module of a bus system, e.g., a CAN bus system.

FIG. 1 schematically shows a communication module 100 for connecting a user or host 110 and/or its execution unit of the CPU to a communication connection and/or a bus 111. For this purpose, communication module 100 is connected via an interface module 104 to user 110 or as a part of the CPU interface to the CPU of user 110, respectively. Therefore, CLK1 identifies a clock input (clock), RS1 identifies a reset input, CTRL1 identifies a control input, ADD1 identifies an address input, DI1 identifies a data input, and DO1 identifies a data output, while W1 identifies an output which provides a wait signal (wait) and INT1 identifies an output having interrupt signals (interrupt).

In the following, the content of this communication module 100 is described, the functionality being selected as an example in accordance with the particular bus system or the communication module i.e., as a CAN communication module, for example. However, the present invention may also be applied to any other communication modules or communication controllers, as well as other bus systems and bus protocols, so that the selected description in the following figures and exemplary embodiments is not to be seen as restrictive in this regard. In particular, the present invention may also be implemented as a dual-channel system, for a FlexRay protocol, for example. However, the CAN or TTCAN application is used as an example embodiment.

For this purpose, communication module 100 contains a control unit 101, in particular a CAN control unit or a CAN core here. A message memory is shown adjacent to it, in particular as a message RAM, e.g., as a single-ported RAM, by 102. A dual-ported RAM may be used, for example, in the scope of a dual-channel application for FlexRay use, for example. Numerals 105 and 106 indicate two intermediate or buffer memories, in particular register components, which are used for buffering in regard to the data and/or message transfer and may additionally contain the corresponding assignment in regard to the corresponding memory space in the message memory. In this embodiment, two registers 105 and 106 are shown, this only being exemplary; one single register or even a register which is appropriately divided into two memory areas may also be used. The data and/or message transfer is controlled via a message handler 103. First register 105 (e.g., as a CPU IFC register) is connected to interface module 104 and control unit 101 via connection V11. Adjacent to it, second register 106 is connected to interface module 104. Both registers are each connected via connections V15 and V16 to message handler 103. The message handler itself is connected via connection V13 to control unit 101 and via V14 to message memory 102. The actual message exchange and/or the message routing is performed via connection V17, which more or less represents the first data path (or a decisive part thereof) and produces a connection between control unit 101, message memory 102, and registers 105 and 106.

If a gateway, in particular a CAN gateway, is constructed from the communication modules shown in FIG. 1, the data transfer, i.e., the transmission of data and/or messages between the communication modules, requires multiple read and write operations, which must be handled, like the data transfer, via the CPU bus (CPU interface), and therefore place a high load on the host CPU, i.e., user 110, and thus slow down the transmission.

TX and RX indicate the bus connections, i.e., TX1 on the transmission side (transmit) and RX1 on the receiver side (receive), as a connection to bus 111. However, in an integrated gateway, these are predefined permanently and inflexibly.

Figure 2:
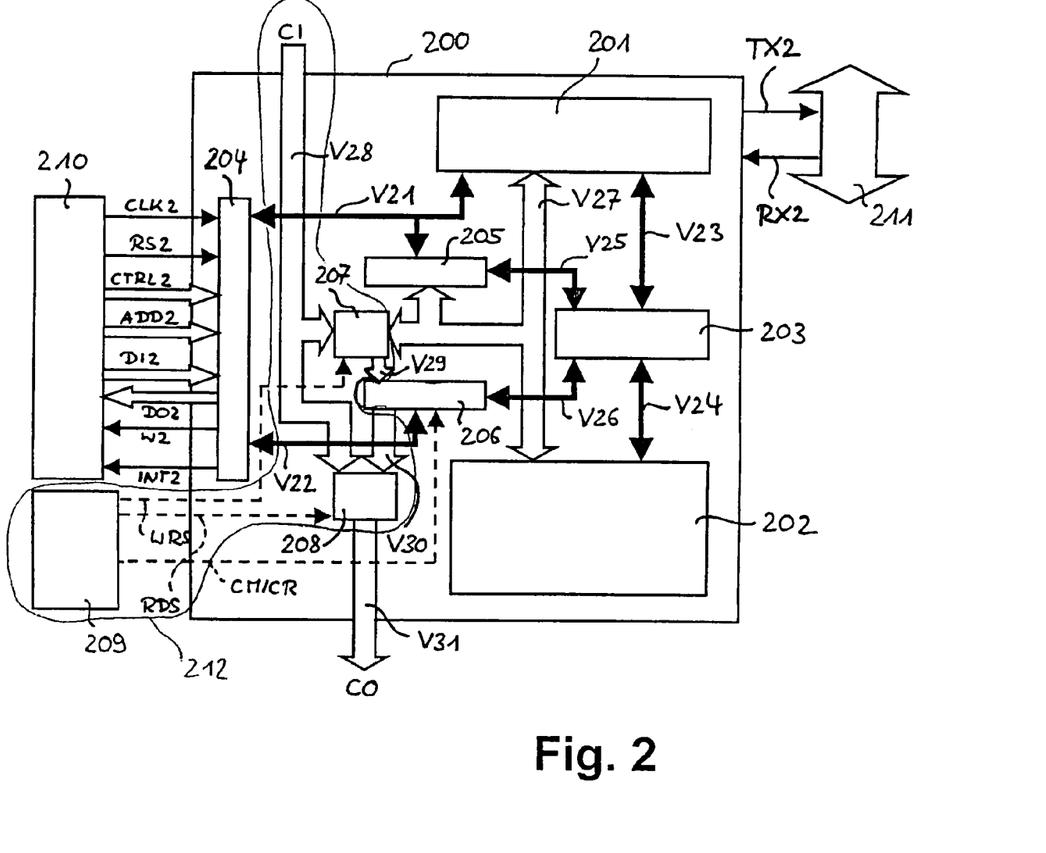
FIG. 2 shows a communication module according to the present invention having a communication interface element.

To solve this set of problems, a communication interface element 212 according to FIG. 2 may be provided, which will be explained in greater detail in the following in connection with communication module 200. The statements already made in FIG. 1 for corresponding parts 100-111 and V11-V17 also apply to parts 200-211 (with the exception f207-209 and 212) and V21-V27 corresponding thereto, of course, in FIG. 2. Thus, FIG. 2 essentially represents the communication module from FIG. 1 having the corresponding extension according to the present invention (207-209 and 212 as well as V28-V31), so that the statements on FIGS. 1 and 2 may be considered together.

Communication module 200 connects a user 210 or a host and/or a host CPU to a bus 211, the bus connections being indicated with TX2 and RX2 corresponding to the transmit output (TX2, transmit) and the receive input (RX2, receive).

This communication module 200 also contains a control unit 201, in particular as a CAN core, a message memory 202, in particular as a message RAM, a message handler 203, the two exemplary registers, identified here by 205 and 206 (the statements about registers 105 and 106 apply accordingly as described above), and the interface module to host 210, identified here by 204. The interface module receives inputs for clock CLK2 (clock), reset RS2, a control input CTRL2 (control), an address input ADD2, and a data input DI2. Furthermore, outputs are provided as a data output DO2, a wait signal W2, and an interrupt output INT2. In this example as well, register 205 is coupled to control unit 201 and interface module 204, via connection V21 here. Register 206 is also coupled here via connection V22 to interface module 204. Similarly, both exemplary registers 205 and 206 are also connected here via connections V25 and V26 to message handler 203. Control unit 201 is connected via connection V23 to message handler 203 and this is connected via connection V24 to message memory 202. The message handler also controls the actual data and/or message transmission between bus 211 and host 210 here.

First data path V17 in FIG. 1 is identified by V27 here and contains a special feature in that it is connected to communication interface element 212, i.e., the gateway interface, instead of to second register 206. In other words, the gateway interface is interposed in the first data path, V27 here, and/or connected to this first data path V27. Communication interface element 212 (gateway interface) accesses first data path V27 to and from message memory 202 and advantageously has the same word width in relation to the transmission as message memory 202 itself. However, an integral part, in particular an integral multiple in relation to the word width, would also be conceivable. The data and/or message transmission is adapted in accordance with the particular bus protocol, e.g., for CAN, a CAN message having the control and status bits. This may be designed in accordance with the particular bus system.

Therefore, an additional second data path having an input CI (cascade input) and an output CO (cascade output) is implemented in communication module 200 via connections V28, V29, V30, V31 as well as switching means 207 and 208. Both switching means 207 and 208 shown in this example are implemented in particular as multiplexers or multiplexing modules. In the example embodiment shown here, two switching means 207 and 208 are thus used; however, using only one switching means is also conceivable.

Therefore, predefinable data and/or messages of the first data path may now be routed directly via the additional second data path without stressing host CPU 210 in accordance with the normal data pathway.

This second data path, i.e., the transmission and/or routing of the data and/or messages via the second data path and in particular the selection or preset of the predefinable data and/or messages is controlled via a controller 209, which is implemented in particular as a finite state machine (FSM). This controller 209, in particular as a finite state machine, may be housed in communication module 200 itself or may be assigned thereto and localized outside it. In particular, in one example embodiment, it may be contained in user 210, the host. In another example embodiment, it is contained directly in gateway interface 212, i.e., the communication interface element. The first switching means, multiplexing module 207, is activatable via a write select output WRS. The second switching means, multiplexing module 208, is activatable via a second output, a read select output RDS. Through this activation of both multiplexers 207 and 208 in the second additional data path of the gateway interface, i.e., the communication interface element, it is possible to control the data transfer, i.e., the transfer of the data and/or messages, in particular to establish the direction of the data and/or messages in relation to the message memory. The selection or definition of the data to be transmitted onto the second data path may be established by a further output CM/CR (communication mask/communication request).

Via CM/CR, e.g., using identifiers and in particular with the aid of a command request register and a command mask register, as well as corresponding control identifiers or control bits, control of the transmission via the second data path as well as the selection or the definitions of the corresponding data and/or messages for the second data path is possible therewith and with outputs WRS and RDS. Therefore, the CPU interface, i.e., in particular interface module 204, e.g., having CPU interface registers 205 and 206, may further be used for the transfer, i.e., the transmission of data and/or messages from and to the local CPU, i.e., host CPU 210, the transmission of the predefinable data and/or messages, i.e., their transfer, being controlled via control inputs WRS, RDS, CM/CR cited.

Figure 3:
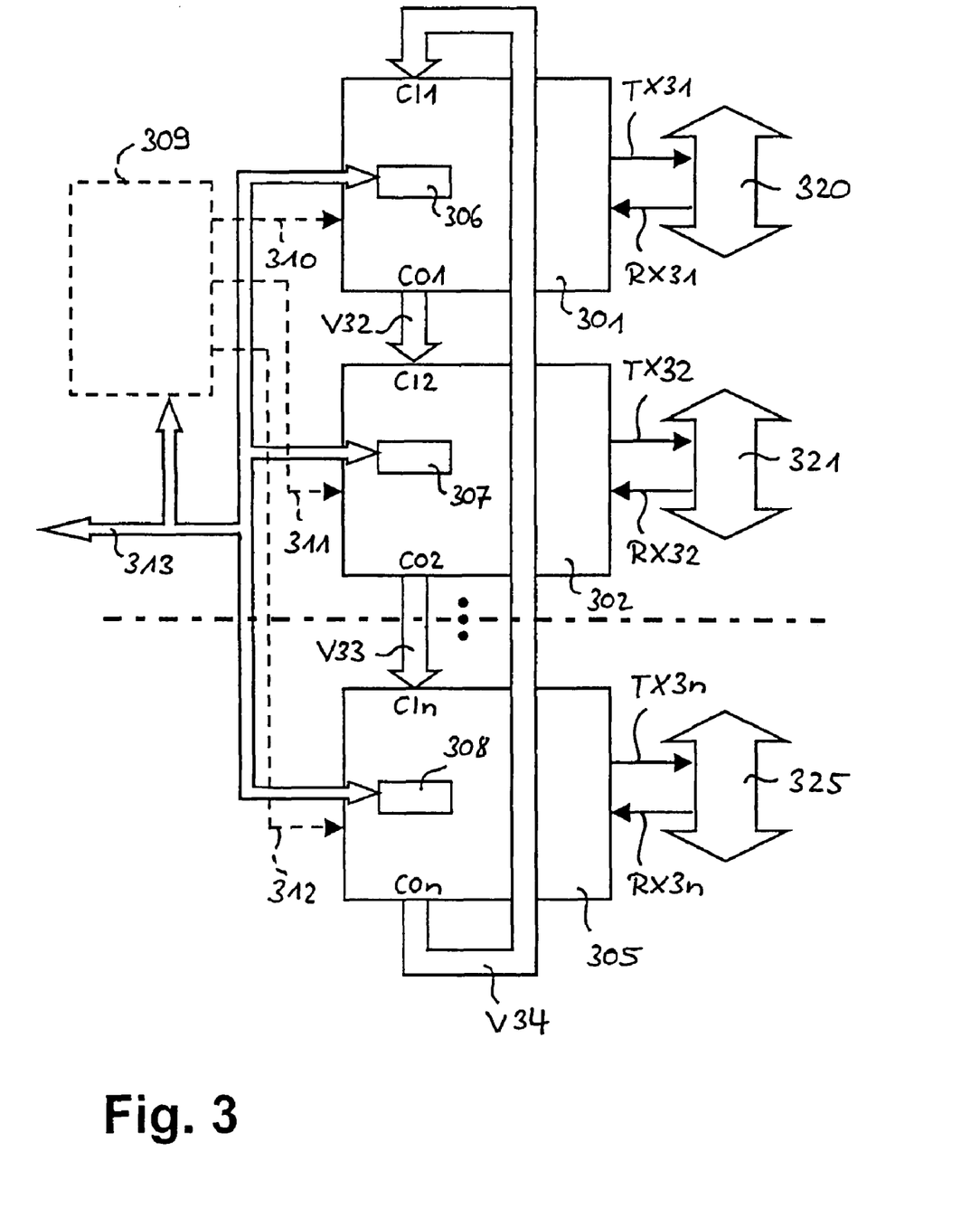
FIG. 3 shows a system having multiple communication modules interconnected with one another, e.g., as a gateway application.

Multiple communication modules may now advantageously be interconnected, e.g., cascaded, to form a gateway via this second additional data path introduced in this way, as shown in FIG. 3. In an example embodiment, any number of communication modules, in particular CAN modules, may be interconnected via the gateway interface, i.e., the communication interface element, to form a gateway and expediently may each be connected annularly from output CO (cascade output) to input CI (cascade input) of the next communication module. This is also possible for other bus systems and for different bus systems at the gateway.

Communication modules 300, 301 through 305 are interconnected in this way in FIG. 3, for example, as CAN modules CAN1, CAN2 through CANn, n being a natural number. Each of these communication modules has a transmit output (TX31, TX32, TX3n) and a receive input (RX31, RX32, RX3n) for connection to a corresponding bus and/or a corresponding communication connection 320, 321, and 325. This variable number of communication modules are interconnected with one another annularly in particular via connections V32, V33, and V34 here. A star connection, inter alia, is also conceivable, however. Connection V32 is situated from output CO1 of communication module 300 to input CI2 of communication module 301, connection V33 is situated from C02 of 301 to CIn of communication module 305, and connection V34 is situated from output COn of communication module 305 to input CI1 of communication module 300.

For reasons of clarity, the registers are combined into register blocks 306, 307, and 308 and represented as CPU interface register CPU IFC, the connection to the host CPU being shown schematically and for the sake of clarity as CPU bus 313. The controllers of the individual communication modules shown in FIG. 2 are represented here in FIG. 3 optionally as a gateway overall controller, i.e., as a gateway finite state machine 309, and control the transmission onto the second data path as described above via outputs 310, 311, and 312. In other words, outputs WRS and RDS and/or CM/CR are implemented via each of connections 310, 311, and 312 in accordance with FIG. 2. Therefore, the gateway interface and/or the communication modules interconnected via the communication interface elements allow data and/or messages to be transferred between all communication modules very rapidly via the second data path. In particular, a message may also be transmitted simultaneously from one communication module to multiple other communication modules.

Such a communication module having a gateway interface, i.e., having a communication interface element, for implementing a second additional data path may be used both as a part of the gateway as shown in FIG. 3 and also as an individual controller or individual component without a gateway function. Even if the communication modules in the hardware are connected together as a gateway, it may be set through the configuration of the software or also taken into consideration directly in the controller which of these communication modules operate together as the gateway and which operate independently, so that a very flexible and selective gateway assembly from the existing or desired communication modules is made possible.

This gateway function, i.e., which message is to be relayed from which bus to which other bus, i.e., the second data path, is controlled via gateway controller 309 cited, i.e., the gateway finite state machine, which is either constructed as a dedicated state machine in the hardware or also runs in software, in particular in the host, and accesses the gateway control inputs via cited special registers, in particular communication request registers or communication mask registers. Therefore, rapid data transmission and high flexibility, in particular free configurability of the number of bus connections, as well as high flexibility in regard to the composition in the construction of a gateway, are advantageously possible.

Figure 4:
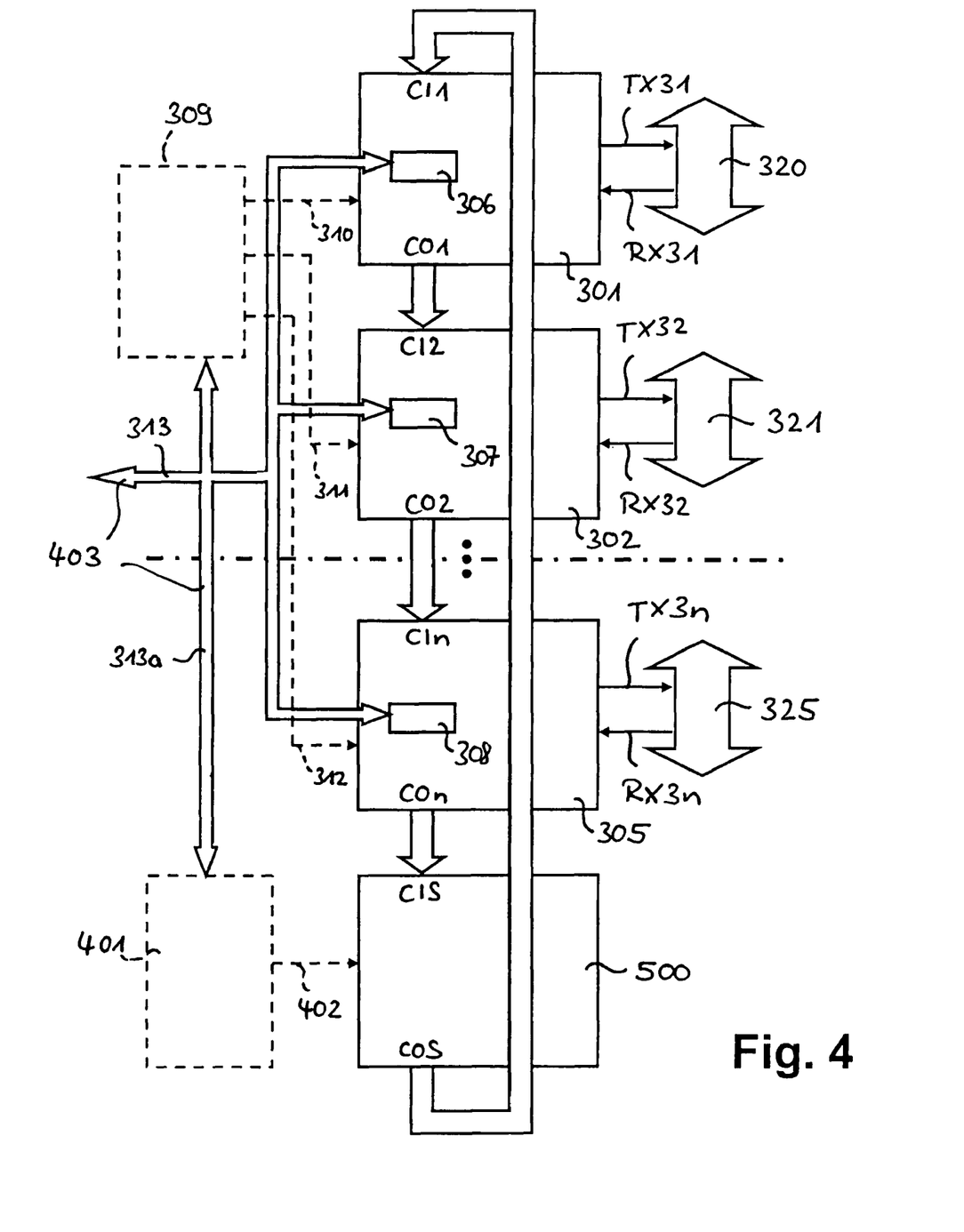
FIG. 4 shows the system of FIG. 3, with an interface module additionally being coupled into the cascade ring.

FIG. 4 shows an arrangement which expands the system just described in FIG. 3 by at least one interface module according to the present invention as a data integration unit (DIU). Identical parts from FIG. 3 are provided with identical reference numerals as in FIG. 3 and will not be described again at this point. The description of FIGS. 2 and 3 may thus also be used in its entirety as a basis for FIG. 4.

As already noted, in these exemplary embodiments, CAN and/or TTCAN modules are emphasized in particular. However, the function according to the present invention and/or the subject matter according to the present invention may be applied to any, even mixed, bus systems or communication systems and to the associated modules.

In addition, an interface module 500 is shown as a data integration unit in FIG. 4, which has an input CIS (cascade input of the interface module) and an output COS (cascade output of the interface module). The interface module is coupled into the interconnected second data paths of the communication interface elements of the communication modules via CIS and COS. For this purpose, interface module 500 is connected via CIS to CO(n) and via COS to CI1 or CI(n+1). Therefore, any number of communication modules or communication interface elements and any number of interface modules, i.e., DIUs, may be interconnected via the gateway interface to form a gateway; for this purpose they are each connected annularly from cascade output to cascade input as shown. The CPU interface of the individual communication modules may furthermore be used for the transfer of messages from and to the local CPU. Therefore, at least one interface module 500 is integrated into the cascade ring already described and the sequences and advantages already described in this regard for FIGS. 2 and 3 also apply to the interface module(s).

A gateway interface generated in this way, having this at least one interface module, thus allows messages and/or data, in particular also through the combination of data and/or messages, to be transferred rapidly between all communication controllers and the interface modules; messages and/or data may also be transmitted in different combinations simultaneously from one or more communication modules to one or more other communication modules. The first data and/or messages which are transmitted onto the second data path may be recombined and/or adapted by the interface module to form second data and/or messages and then relayed on the cited second data path, which results in further increased flexibility and efficiency.

A communication module having a gateway interface having at least one such interface module may be used both as a part of a gateway and also as an individual controller without a gateway function. Even if the communication controller is interconnected in the hardware as a gateway, it may be set through the configuration of the software which of these communication controllers cooperate as the gateway and which operate independently.

The gateway function is controlled (which message and/or message parts, i.e., data and/or messages, are to be relayed from which bus to which other bus) via at least one controller (gateway controller 209 or 309 and/or module or routing controller 401), which is either constructed as a dedicated state machine in the hardware or runs in the software, in particular on the host CPU, and accesses the appropriate control inputs or control accesses via special registers.

CPU bus 313 is expanded in FIG. 4 by one connection 313*a* to form CPU bus 403. This is performed in order to link a second controller, module controller 401. This controller 401 is, like controller 309 or controller 209 from FIG. 2, implemented as a finite state machine (FSM). This module controller 401, in particular as a finite state machine, may be housed in interface module 500 itself or may be assigned thereto and localized outside it. In particular, in one example embodiment, it may be contained in user 210, the host. In another example embodiment, it is contained directly in gateway interface 212, i.e., the communication interface element. Controller 401 may also be housed in a communication module, e.g., in 305 or 301. The separation between controller 309 and controller 401 is also advantageous, but not required. Thus, controllers 309 and 401 may be combined in one controller, e.g., in 209, for which the above-mentioned considerations also apply in regard to its position/localization.

Controller 401 controls interface module 500 via at least one control access or control input 402. For this purpose, interface module 500 is described in an advantageous embodiment once again in greater detail in FIG. 5.

Figure 5:
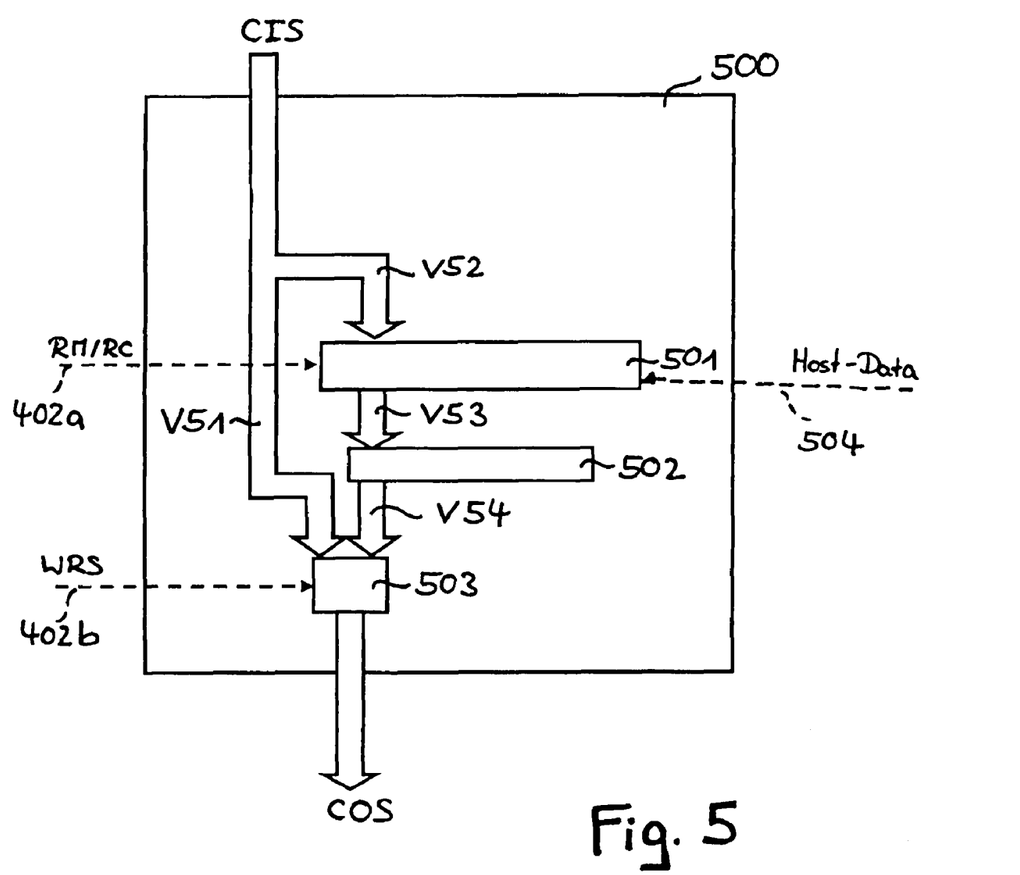
FIG. 5 shows an interface module according to the present invention.

CIS again describes the input and COS describes the output of the data integration module, i.e., interface module 500, therein. Two transmission paths are shown in the interface module. The first transmission path is identified by V51 and leads directly from input CIS to a switching means 503, which is implemented in particular as a multiplexer or multiplexing module. The second transmission path also leads via connections V52 and V53 and V54 to switching means 503. Through the switching means, in particular the multiplexing module, the two transmission paths may thus be connected to output COS. According to the present invention, a coupling element 501 is shown in the interface module, which, via CIS or via a further data path (identified here by 504 host data), integrates data from the finite state machine or special function registers, which receive this data from the connected host CPU or further modules such as other communication modules or other modules and/or bus users situated externally to the cascade ring, which are not connected to the cascade ring. A direct link of the affected modules to this additional input is also conceivable. The permission to write data in the interface module is granted in this case by the gateway controller. This incoming data and/or messages or parts thereof are then reassembled. Therefore, first data and/or messages are combined to form second data and/or messages and relayed.

In particular, in an example embodiment, a memory element 502 is provided, in particular as a register or register module, which stores the second, i.e., the recombined data and/or messages before it is relayed. The data and/or messages may be combined in memory element 502, i.e., the selected data and/or messages may be selected in sequence as bits or bytes or also bit groups of any size in particular and reassembled in memory element 502 before the completely new data or the new message is relayed. Memory element 502 may also be a part of the coupling element or a memory of similar function may be provided in the coupling element. It is also conceivable that the coupling element relays the data and/or messages directly without intermediate storage. In one case, the first data and/or messages may reach the coupling element and be immediately recombined there and relayed. The first data and/or messages may also be previously stored inside or outside the coupling element, then assembled to form second data and/or messages and then relayed with or without intermediate storage. Whether and how the data is stored and reassembled is thus a function of the particular embodiment, in particular in regard to the transmission in relation to clock rate and synchronization as well as word width on the second data path. The interconnection onto this second data path is performed via above-mentioned switching means 503.

Coupling element 501 (with and without memory element) and/or switching means 503 is controlled from controller 401 in accordance with the description of FIG. 4. The switching means, multiplexing module 503, may be activated via a write select output WRS 402b. Through this activation of the multiplexer, it is possible to control the data transfer, i.e., the transmission of the data and/or messages. The multiplexer in the data path thus allows the data transfer to be controlled. The transfer is controlled via control signal WRS.

Further data from modules (such as other communication modules or other modules and/or bus users situated externally to the cascade ring), which are not connected to the cascade ring, may be transferred into the interface module via a signal bus which varies depending on the application (variation of the bit width). This is performed via the signal host data via 504, as already described above. This signal bus 504 may be activated directly by the gateway controller or by one or more modules (in the event of multiple modules the access occurs via a multiplexer, for example), which wish to feed data into the cascade ring without having access to the CPU or a communication module. Such modules are, as already described, for example, other communication modules or other modules and/or bus users situated externally to the cascade ring.

The selection or definition of the data to be transmitted onto the second data path, i.e., the combination of the first data and/or messages to form the second data and/or messages, may be established by a further output or further signals RM/RC (routing mask/routing control) 402a.

Therefore, it is possible to select or define the appropriate data and/or messages to be combined via RM/RC, for example, using identifiers and in particular with the aid of the mask register and/or a control register as well as corresponding selection identifiers or selection bits. The data integration module, i.e., the interface module (DIU), thus allows the generation of new messages from data of different communication controllers and its simultaneous transmission to one or more controllers via the cascade ring. A change in the communication controller is therefore not necessary.

With the aid of this coupling element (which is used to mediate and switch through individual or multiple signals and is designed specifically for the application), e.g., as a coupling field, switching network, or also as a register transfer block, the appropriate parts of a message (including bit level) may be re-sorted and combined from different messages. In a register transfer block, the message from CIS is distributed to multiple registers. The data is then integrated by transmitting individual and/or complete register contents to the appropriate position in element 502, for example.

The function (which partial messages are to be combined to form a new message) is controlled via the controller cited, which is either constructed as a state machine in hardware or accesses the control inputs as software, in particular via the host CPU using special registers.

Any number of interface modules or DIUs may be linked via the cascade ring. They are each connected annularly from cascade input to cascade output. Each DIU may implement different functions, which may be designed specifically for the application as noted, without the individual units influencing one another.

What is claimed is:

1. An interface module for interconnection with at least two communication modules connected to a databus, each of the at least two communications modules having a communication interface element, comprising:
    an input configured to receive at least one of a first data and a first message of a first data;
    a coupling element;
    an output; and
    a switching element;
    wherein:
    a first data path is provided to and from the databus and to and from a message memory of one of the at least two communication modules, the message memory being assigned to the communication interface element, the communication interface element provides a second data path, which is configured so that the at least one of the first data and the first message of the first data path are at least partially conducted via the second data path, each respective communication interface element has one input and one output by which the at least two communication modules are connected together via the second data path, the interface module is connected into the second data path via the input and the output so that there is an interconnection of the at least two communication modules and the interface module, the coupling element is provided in the second transmission path, and the coupling element is configured such that the at least one of the first data and the first message is at least partially combined to form at least one of second data and a second message for being transmitted via the second data path, and wherein the interface module and the communication module are implemented using a processor and a memory.

2. The interface module as recited in claim 1, wherein the switching element is configured as a multiplexing module.

3. The interface module as recited in claim 1, wherein the coupling element is configured as a coupling field.

4. The interface module as recited in claim 1, wherein the coupling element includes a register transfer block.

5. The interface module as recited in claim 1, further comprising:
    a memory element which is provided in the second transmission path.

6. The interface module as recited in claim 5, wherein the memory element is configured as a register module.

7. The interface module as recited in claim 1, further comprising:
    a controller which controls the coupling element.

8. The interface module as recited in claim 1, further comprising:
    a controller which controls the switching element.

9. The interface module as recited in claim 1, further comprising:
    a controller which controls the coupling element; and a memory element in the second transmission path, wherein the memory element is a register module;
wherein the switching element is configured as a multiplexing module, and
wherein the coupling element is a coupling field, and includes a register transfer block.

10. A system having at least two communication modules comprising:
a communication interface element including a coupling element; and an interface module connected to the communication interface element, the interface module having an input and an output, and a switching element, the input being configured to receive at least one of a first data and a first message of a first data path;
wherein:
a first data path is provided to and from the databus and to and from a message memory of one of the at least two communication modules, the message memory being assigned to the communication interface element, the communication interface element provides a second data path, which is configured so that the at least one of the first data and the first message of the first data path are at least partially conducted via the second data path, each respective communication interface element has one input and one output by which the at least two communication modules are connected together via the second data path, the interface module is connected into the second data path via the input and the output so that there is an interconnection of the at least two communication modules and the interface module, the interface module is connected into the second data path via the input and the output, the interface module at least partially receives the at least one of the first data and the first message via the second data path, the coupling element in the interface element is configured such that the at least one of the first data and the first message is at least partially combined to form at least one of a second data and a second message and transmitted via the second data path, and wherein the interface module and the communication module are implemented using a processor and a memory.

11. The system as recited in claim 10, further comprising:
a controller which controls the coupling element.

12. The system as recited in claim 10, further comprising:
a controller which controls the switching element.

13. A communication module system, comprising:
at least two communication modules, each including a communication interface element, wherein a coupling element is provided in the communication interface element;
an interface module assigned to at least one of the at least two communication modules, wherein the interface module includes an input and an output, and wherein the interface module is connected to at least one of the at least two communication modules;
and a message memory provided in a first data path linking the message memory, wherein at least one of a first data and a first message is transmitted on the first data path one of from the message memory and to the message memory;
wherein:
the message memory is assigned to the communication interface element, the communication interface element provides a second data path, which is configured so that the at least one of the first data and the first message of the first data path are at least partially conducted via the second data path, each respective communication interface element has one input and one output by which the at least two communication modules are connected together via the second data path, the interface module is connected into the second data path via the input and the output so that there is an interconnection of the at least two communication modules and the interface module, the coupling element is provided in the second transmission path, and the coupling element is configured such that the at least one of the first data and the first message is at least partially combined to form at least one of a second data and a second message and transmitted via the second data path, and wherein the interface module and the communication module are implemented using a processor and a memory.

14. The communication module system as recited in claim 13, wherein each communication module includes a communication interface element, and wherein the two communication modules are connected via the second data path of each communication module, and wherein the interface module at least partially combines the at least one of the first data and the first message of a first communication module to form the at least one of the second data and the second message and transmits the at least one of the second data and the second message via the second data path to a second communication module.

15. The communication module system as recited in claim 14, wherein the communication module and the interface module are connected annularly via the second data path.

16. A method for generating at least one of data and a message, the method comprising:
transmitting at least one of a first data and a first message on a first data path connecting a message memory, wherein the at least one of the first data and the first message is transmitted to an interface module;
transmitting at least a part of the at least one of the first data and the first message via a second data path to the interface module; and
transmitting, in the interface module, the at least one of the first data and the first message via the first data path and the second data path such that the at least one of the first data and the first message is partially combined to form at least one of a second data and a second message and transmitted again onto the second data path;
wherein there at least two communication modules, each having a communication interface element,
wherein one of the communication interface elements provides the second data path, which is configured so that the at least one of the first data and the first message of the first data path are at least partially conducted via the second data path,
each respective communication interface element has one input and one output by which the at least two communication modules are connected together via the second data path,
the interface module is connected into the second data path via the input and the output so that there is an interconnection of the at least two communication modules and the interface module,
a coupling element is provided in the second transmission path, and
the coupling element is configured such that the at least one of the first data and the first message is at least partially combined to form at least one of second data and a second message for being transmitted via the second data path.

* * * * *